United States Patent [19]
Cunningham

[11] 3,905,145
[45] Sept. 16, 1975

[54] GRAB-ALL FISH HOLDER

[76] Inventor: Maceo Cunningham, 2004 Jasper St., Washington, D.C. 20020

[22] Filed: Nov. 28, 1973

[21] Appl. No.: 419,793

[52] U.S. Cl. .................................................. 43/53.5
[51] Int. Cl.² ......................................... A01K 97/00
[58] Field of Search ............................... 43/53.5

[56] References Cited
UNITED STATES PATENTS
| | | | |
|---|---|---|---|
| 2,091,893 | 8/1937 | Tillinghast | 43/53.5 |
| 2,547,592 | 4/1951 | Morris | 43/53.5 |
| 3,389,491 | 6/1968 | Lowrey | 43/53.5 |

*Primary Examiner*—Robert Peshock
*Assistant Examiner*—Daniel J. Leach

[57] ABSTRACT

A fish holder intended for use to facilitate the removal of a fishing hook from a freshly caught fish and formed of a funnel-like open ended receptacle having a longitudinal slot extending from end to end to permit a fishing line to be drawn therethrough with the fish thus being drawn through the funnel until its head portion projects through the narrow end with the tail projecting from the open end, and a clamp receiving slot disposed in the funnel adjacent the top narrow end thereof and adapted to receive the end of a serrated clamp thereinto in a manner to engage the gills of a fish in the funnel to secure the fish in the funnel thus allowing the hook to be removed from the fish.

4 Claims, 7 Drawing Figures

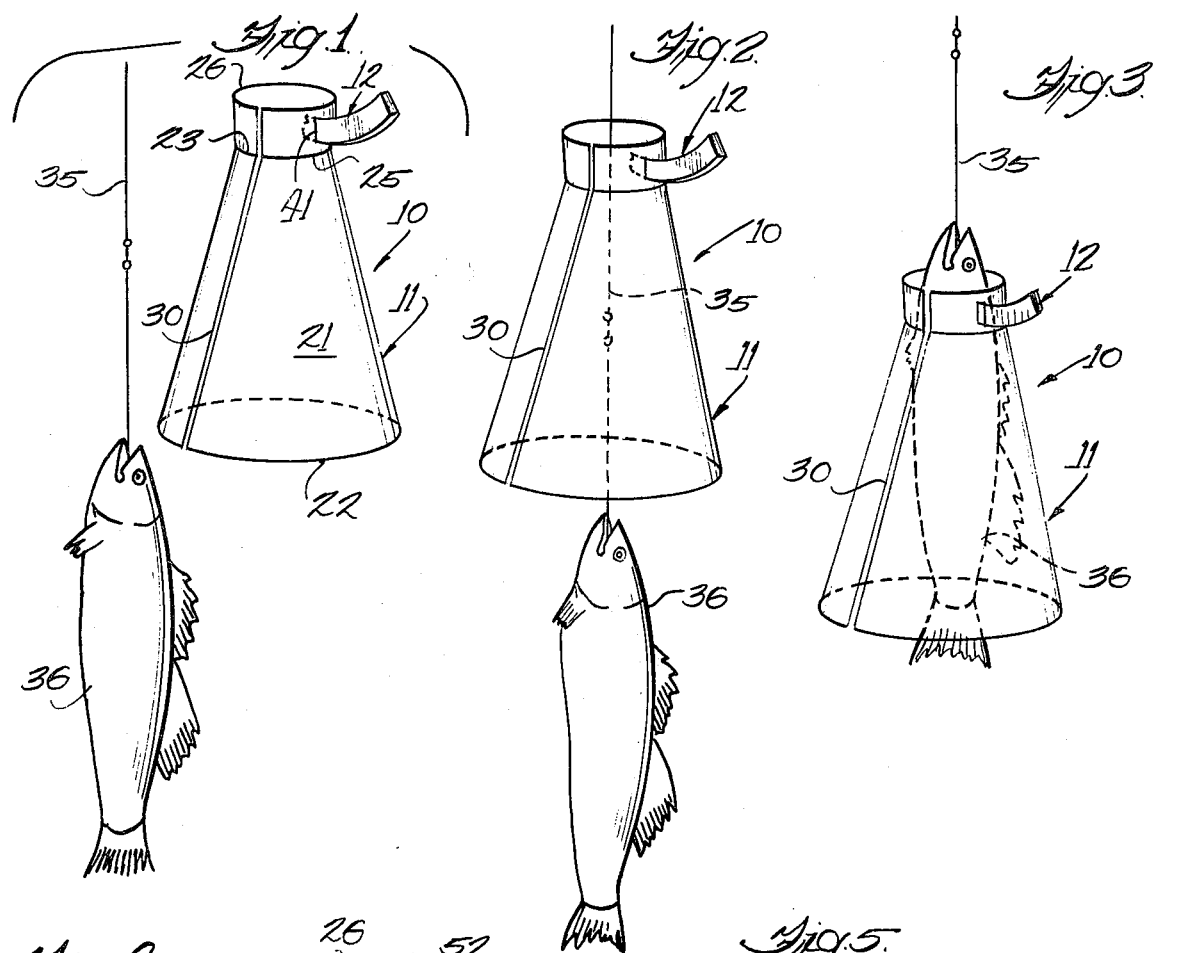
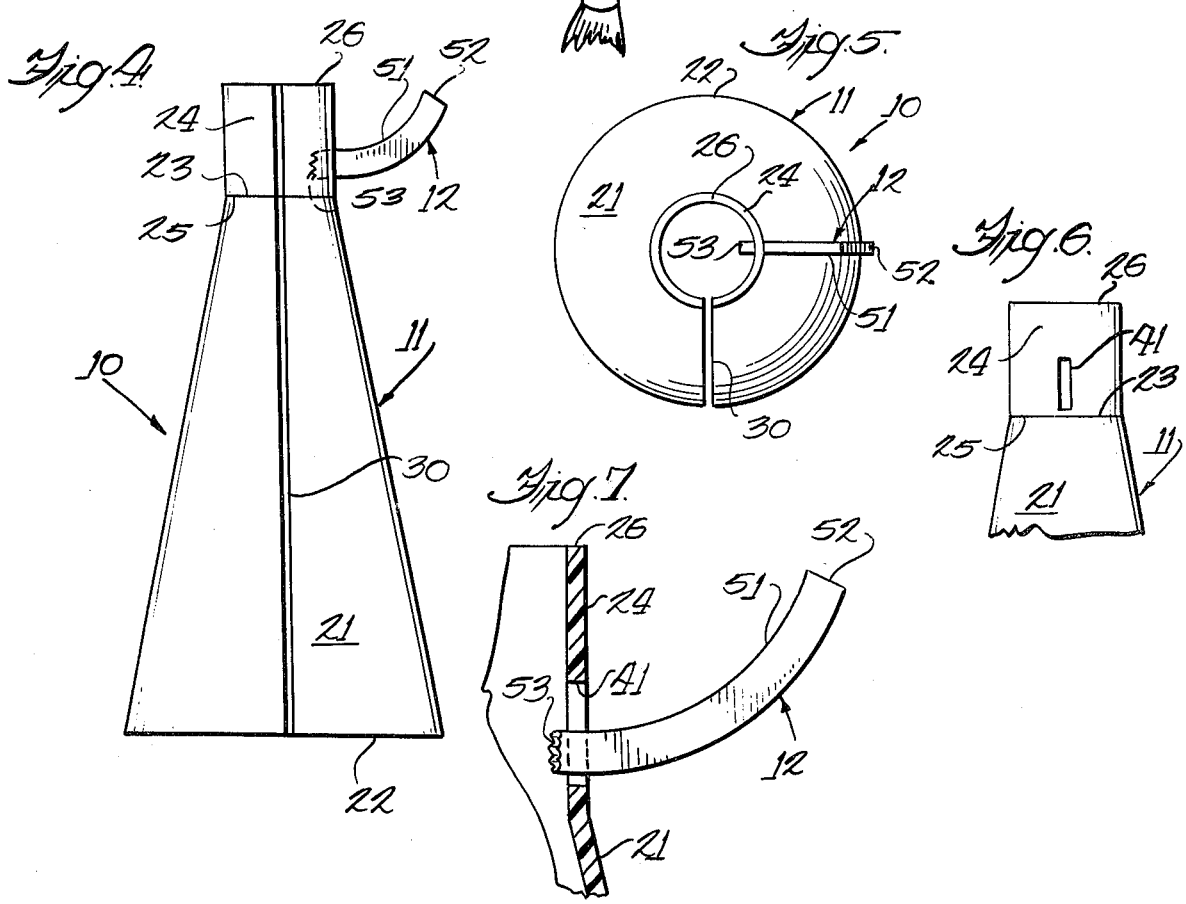

GRAB-ALL FISH HOLDER

BACKGROUND OF THE INVENTION

1. Field of the Invention

This invention relates generally to holding devices and more particularly to a novel fish holder adapted to have a still live struggling fish positioned therein in a manner to hold the fish against slipping back into the water as well as to protect an individual's hand from injury from the fins or scales thereof, and providing for ease of removing the fishing hook from the fish.

2. Description of the Prior Art

The sport of fishing is exceptionally popular among individuals of various ages, with all such individuals often finding that the most difficult, frustrating and time consuming part of catching a fish is the procedure of having to remove the hook from the still live struggling fish after being drawn back into the boat or on the shore in a manner not hooking the hook in the individual's hand or clothing and without damaging the fishing line. Due to the sharpness of the fish scales and gills it is not unusual for the fishermen to cut themselves or otherwise injure their hand while attempting to hold the struggling fish to remove the hook from the fish's mouth.

In view of this difficulty, various devices have been proposed in the prior art for holding fishes and the like to permit removal of a hook therefrom while the fish is alive. However, such devices are in general relatively complicated, involve a number of moving parts, are expensive to manufacture and purchase, are difficult in use, and are subject to malfunctions affecting the proper operation of the same when in use.

SUMMARY OF THE INVENTION

The present invention remedies and overcomes all of the deficiencies and disadvantages of presently available fish holders by providing a novel fish holder structure adapted to pass the fishing line therethrough and draw the fish thereinto and then temporarily secure the fish in the holder in a manner to permit easy removal of the hook from the still live struggling fish, the fish still being retained in the holder until released therefrom by the fisherman into a carrier or the like for the holding of the fish until a later time.

It is a feature of the present invention to provide a fish holder adapted to have a fish positioned therein while still live and struggling in a manner to hold the fish against slipping back into the water and to protect the hands and clothing of an individual from injury from the fins or scales of the fish while permitting ease of removal of the hook from the fish's mouth.

A further feature of the present invention provides a fish holder adapted to receive a fish therein for removing the fishing hook therefrom in a rapid and expedient manner requiring a minimum of effort and no difficulty whatsoever on the part of the fisherman.

Still a further feature of the present invention provides a fish holder which simplifies the task of removing a fishing hook from the fish's mouth in a manner conserving fishing time and making the sport of fishing more enjoyable.

Still a further feature of the present invention provides a fish holder which is relatively simple in its construction and which therefore may be readily manufactured at a relatively low cost and by simple manufacturing methods.

Yet still a further feature of the present invention provides a fish holder which is devoid of moving parts and which therefore is unlikely to get out of order, the fish holder being rugged and durable and therefore may be guaranteed by the manufacturer to withstand many years of usage.

Yet still a further feature of the present invention provides a fish holder which is easy to use and reliable and efficient in operation.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of the fish holder of the present invention in positions preparatory for use with the fish suspended on the fishing line adjacent thereto;

FIG. 2 is a perspective view similar to FIG. 1 but illustrating the fishing line within the fish holder preparatory to the fish being drawn thereinto;

FIG. 3 is a perspective view similar to FIG. 2 except that the fish has been drawn into a working position within the fish holder and the clamp engaged with the gills of the fish to temporarily secure the fish therein for the hook to be removed therefrom;

FIG. 4 is a front elevational view of the fish holder;

FIG. 5 is a top plan view of the fish holder;

FIG. 6 is a fragmentary side elevational view of the fish holder illustrating the clamp slot therein; and FIG. 7 is an enlarged fragmentary cross-sectional view taken along a vertical plane bisecting the clamp slot and illustrating the clamp in position therein.

DESCRIPTION OF THE PREFERRED EMBODIMENT

Referring now to the drawings in detail there is illustrated a preferred form of a grab-all fish holder constructed in accordance with the principles of the present invention and designated generally in its entirety by the reference numeral 10 and which is comprised of two component parts, namely a funnel-like structure 11 and a knife-like clamp 12. The fish holder 10 may be manufactured out of metal, wood, hard rubber, plastic, or any other suitable satisfactory material, with the preferred embodiment being manufactured of a lightweight polypropylene plastic which may be provided in a variety of colors and decorations in a manner enhancing the aesthetic appearance thereof.

The funnel-like structure 11 is formed of a hollow truncated cone having side walls 21, a bottom edge 22, and a top edge 23. Formed integrally with top edge 23 is an elongated cylindrical member having side walls 24, a bottom edge 25, and a top edge 26. The side walls 21 and 24 are provided with a longitudinal slot 30 extending therethrough from end to end, the slot being of a width to permit a fishing line to be drawn therethrough, such as illustrated by fishing line 35 having a fish 36 attached thereto by a fishing hook (not shown) engaged in the mouth of the fish.

Side wall 24 is provided with a longitudinally extending clamp slot 41 therein which is angularly spaced apart from the slot 30 and which is of an elongated rectangular configuration adapted to slidingly receive therethrough the knife-like clamp 12.

The knife-like clamp 12 is formed of a substantially flat arcuately formed body member 51 having a handle end 52 and a serrated fish engaging end 53 which is provided with serrated teeth projecting outwardly therefrom in a manner to selectively engage the body of a fish as will be later described. The body member 51 is of a width to be snugly received in clamp slot 41, such receipt preferably placing the side walls of the body member in frictional engagement with the side walls of the clamp slot for frictionally retaining the body member relative to the side wall 24.

It is to be understood that the fish holder 10 may be manufactured in different sizes to suit different types and sizes of fish, with the preferred embodiment having an overall height of approximately 18 inches, the slot 30 being approximately 1/16 inch wide, the diameter at top end 26 being about 3 inches, and the diameter of bottom edge 22 being about 8 inches.

In operation, when the fish 36 is landed on fishing line 35 and brought in to the shore or boat or other location where the fisherman is at, the fishing line is then slipped through slot 30 such that the line and fish is in the position of FIG. 2, after which the line is pulled upward or, alternatively, the fish holder 10 is moved downward in a manner that the still live struggling fish is drawn into the fish holder with the fish head projecting outwardly of the top end 26 providing ease of access to the fishing hook in the fish. The fisherman then drives the knife-like clamp 12 inwardly of the side wall 24 to engage the serrated end 53 with the gills or other body surface of the fish to temporarily secure the fish firmly in the fish holder, after which the fisherman is free to easily remove the fishing hook from the mouth of the fish. The fish is thus retained in the fish holder such that after the fish hook has been removed, the fish holder is placed into or over a fish carrier, such as a basket or the like, at which time the clamp 12 is released from the fish to permit the fish to slip outwardly of the bottom end 22 of the fish holder to be deposited into the fish carrier.

There is thus provided a novel fish holder providing ease of holding a fish against slipping back into the water in a manner protecting the hands and clothing of a fisherman from injury from either the fish hook or the fins and scales of the fish, the fisherman easily removing the fishing hook from the still live struggling fish and then safely depositing the fish into a fish carrying receptacle for later carrying and transporting of the fish.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A fish holder intended for use by a fisherman in the temporary holding of a still live struggling fish in a secure and safe manner to permit removal of a fishing hook from the fish's mouth to free the fishing line for further usage, the fish holder comprising:

a hollow substantially funnel-shaped open ended rigid body member having a bottom end of a larger cross-sectional area than a top end thereof and adapted to receive the body of fish therethrough with the head and tail of the fish projecting from the open top and bottom ends respectively, said funnel-like body member including a rigid truncated hollow conical portion having a circular bottom base end and a circular top end with a conical shaped side wall interconnecting said top and bottom ends, and an elongated cylindrical body portion having a diameter substantially equal to the diameter of said conical portion top end, said cylindrical portion having a top end and a bottom end and a cylindrical side wall, said cylindrical bottom end being permanently affixed to said conical portion top end concentric therewith and extending axially outwardly therefrom;

a longitudinal slot extending through the body member from said conical portion base end longitudinally through said conical side wall and said cylindrical side wall and terminating at said cylindrical top end, the slot being of a width to permit a fishing line to pass freely therethrough;

an elongated rectangularly shaped opening disposed vertically in said cylindrical side wall surface at a position spaced circumferally from said slot and extending parallel to said slot; and a knife-like clamping element mounted in the body member and frictionally associated with the opening therein and adapted to pass through the opening to engage the body surface of a fish drawn into the body member to retain the fish in a position with the head projecting outwardly of the top end of the body member to permit ease of removal of the fishing hook from the mouth of the fish, said knife-like clamp member being of an arcuate longitudinal configuration having rectangularly shaped cross-section with a handle end projecting outwardly of said slot and a fish engaging jaw end projecting inwardly of said slot, said fish engaging jaw end of said clamp member provided with a plurality of vertically spaced apart outwardly projecting serrated triangular shaped teeth forming members to securely engage the body of a fish within the body member, said clamp member movable in a vertical plane into and out of said slot between a fish retaining position engaging a fish inwardly of the body member with said fish engaging jaw end to retain the fish in position therein, and a fish releasing position wherein said fish engaging jaw end is spaced apart from the body of said fish to permit insertion of and removal of said fish from said body member.

2. The fish holder as set forth in claim 1 wherein said slot for receiving said fishing line therethrough is about 1/16 inch wide, the diameter of said cylindrical portion is about 3 inches, the diameter of said conical top end is about 3 inches, the diameter of said conical portion bottom base end is about eight inches, and the overall vertical height of said fish holder is about 18 inches.

3. The fish holder as set forth in claim 2 wherein the conical portion and cylindrical portion of said funnel-like structure are formed integrally with each other to provide a unitary structure.

4. The fish holder as set forth in claim 3 wherein the funnel-like structure is manufactured of a polypropylene plastic material.

* * * * *